Patented June 2, 1931

1,807,729

UNITED STATES PATENT OFFICE

ARNOLD BRUNNER, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

NEW ω-HALOGEN-METHYL DERIVATIVES OF PHENOL AND ITS HOMOLOGUES AND A NEW PROCESS OF PREPARING THE SAME

No Drawing. Application filed April 26, 1930, Serial No. 447,761, and in Germany February 26, 1929.

The present invention relates to new ω-halogen-methyl-derivatives of phenol and its homologues and to a new process of preparing the same.

I have found that new products are obtainable by reacting upon phenol or a homologue thereof, as, for instance, cresol with an aqueous solution of formaldehyde which is saturated with a hydrogen halide.

My new products are obtainable either in the crystallized state or in the form of resinous compounds. They contain halogen in their molecule, which most probably is present in the form of ω-halogen-methyl groups. This assumption is based upon the fact that our new compounds, when reacted upon with a phenol yield higher condensed compounds, even in the absence of a condensing agent, while hydrochloric acid is split off. When reacted upon with water at boiling temperature, or when treated with an alkali, our new products yield reaction products having similar properties as "bakelite" and representing probably higher polymerized compounds.

According to the conditions of reaction, products of varying properties are obtainable. When introducing, for instance, phenol at a moderate temperature but rather quickly into an aqueous solution of formaldehyde, which is saturated with hydrochloric acid a resinous product is obtainable, which is soluble in ether, benzene or other organic solvents. It contains between 28–35% chlorine and most probably represents a mixture of different compounds which all contain in their molecule ω-chloro-methyl-groups.

From the technical cresol mixture there may be obtained a similar product in an analogous manner.

On the other hand by slowly introducing phenol at a low temperature into a mixture of formaldehyde and hydrochloric acid there is obtainable, besides resin-like products, in a large yield a crystalline compound of the formula $C_{10}H_{10}O_2Cl_2$ having probably the following constitution:

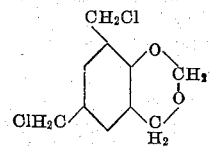

From ortho-cresol and para-cresol there are obtainable under similar conditions crystalline substances which contain 2 chloro-methyl groups, but no heterocyclic ring system. They correspond probably with the following constitutions:

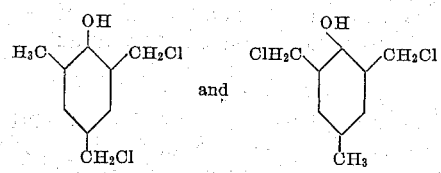

The following examples serve to illustrate the invention, but they are not intended to limit it thereto, the parts being by weight:

1. 300 parts of a 30% formaldehyde solution are mixed with 240 parts of concentrated hydrochloric acid. Gaseous hydrogen chloride is introduced until the solution is saturated therewith. 77 parts of phenol are then added within 2–4 hours, while thoroughly stirring and further introducing gaseous hydrogen chloride. During this operation the temperature is kept at about 40° C.–45° C. The introduction of the gaseous hydrogen chloride is continued hereafter for a short time until no further reaction-heat is evolved. There is obtained a viscous, resin-like product. It is separated from the mother liquor (which can be used again for preparing another batch by compensating the formaldehyde used up by a para-formaldehyde and introducing hydrochloric acid) washed with water of 40° C. and dried in vacuo. The temperature is then kept at about 70° C. some time until the mass has become homogenous.

After cooling, there is obtained a viscous, faintly brownish, odorless product which dissolves in ether, benzene, acetone and acetic ether and which is scarcely soluble in water and petroleum ether. After standing for a prolonged time, it becomes turbid on account of the separation of a crystalline matter which is identical with the product obtainable according to Example 3.

2. A technical mixture of cresol (tricresol) is treated with formaldehyde and hydrochloric acid under the same conditions as in Example 1. When washing the viscous product with water of 40° C., it becomes more solid. It is dissolved in ether, dried with calcium chloride and the solvent is distilled off. The resinous product thus obtained is very similar to that of Example 1 only a little more solid.

3. 600 parts of para-formaldehyde are suspended in 3250 parts of concentrated hydrochloric acid. Gaseous hydrochloric acid is introduced, until a clear, completely saturated solution is obtained. Thereafter, 282 parts of phenol are introduced within 8 hours, while stirring vigorously and cooling to 5° C.–10° C. There is obtained a thick, whitish oil. It is separated from the mother liquor, washed with cold water and stirred with ether. Thereby crystallization takes place. The crystals are filtered off and dried in the air. After recrystallization from hot acetic ether, the substance melts at 117° C. It is easily soluble in acetone, and scarcely soluble in cold alcohol, petroleum ether and water. The analysis and the determination of molecular weight show that it has the formula:

$$C_{10}H_{10}O_2Cl_2.$$

4. Into a mixture of formaldehyde and hydrochloric acid prepared according to Example 3 there are introduced within 8 hours, while vigorously stirring, 540 parts of molten para-cresol at about 20° C. There is first obtained an oil which solidifies during the operation into crystalline aggregates. They are filtered with suction, washed with a small quantity of water and dried in a current of air. After recrystallization from hot petroleum ether, the product melts at 86° C. It is easily soluble in ether, benzene, alcohol and acetic ether and scarcely soluble in water and cold petroleum ether. According to the analyses it has the formula $C_9H_{10}OCl_2$.

I claim:

1. The process which comprises reacting upon a member of the group consisting of phenol and its homologues with formaldehyde in the presence of a concentrated hydrogen halide solution.

2. The process which comprises reacting upon a member of the group consisting of phenol and its homologues with an aqueous formaldehyde solution which is saturated with gaseous hydrogen chloride.

3. The process which comprises saturating an aqueous solution of formaldehyde with hydrogen chloride and introducing slowly into the reaction mass a member of the group consisting of phenol and its homologues.

4. The process which comprises saturating an aqueous solution of formaldehyde with hydrogen chloride and introducing slowly into the reaction mass a member of the group consisting of phenols and its homologues while stirring.

5. As new compounds the products which are obtainable by reacting upon a member of the group consisting of phenols and its homologues with formaldehyde in the presence of a concentrated hydrogen halide solution.

6. As new compounds the products of the general formula:

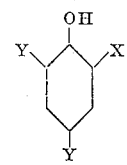

wherein X represents an ω-halogen-methyl group one Y represents an ω-halogen-methyl group the other Y stands for hydrogen or methyl.

7. As new compounds the products of the general formula:

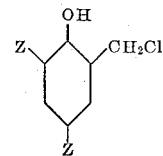

wherein one Z represents a methyl group the other Z represents an ω-halogen-methyl group.

In testimony whereof, I affix my signature.

ARNOLD BRUNNER.